United States Patent

[11] 3,614,252

[72] Inventors Dillard L. Rose;
Coy D. Osburn, Tulsa, Okla.
[21] Appl. No. 218
[22] Filed Jan. 2, 1970
[45] Patented Oct. 19, 1971
[73] Assignee T. D. Williamson, Inc.
Tulsa, Okla.

[54] TAPPING APPARATUS
11 Claims, 9 Drawing Figs.
[52] U.S. Cl. .................................................. 408/9
[51] Int. Cl. ............................................. B23b 41/08
[50] Field of Search .......................................... 77/37–42, 32.7

[56] References Cited
UNITED STATES PATENTS
3,411,384  11/1968  Ver Nooy ..................... 77/37

Primary Examiner—Francis S. Husar
Attorney—Hyer, Eickenroht & Thompson

ABSTRACT: The tapping apparatus disclosed has a feed screw for moving a boring bar axially upon rotation of the boring bar relative to the feed screw. A drive sleeve rotates the boring bar to provide such relative rotation and to rotate a cutter attached to the boring bar to cause the cutter to cut a hole in a pressure vessel. Both the feed screw and the drive sleeve are rotated independently by fluid motors. The pressure of the fluid to each motor is maintained constant, after the initial relative rotation between the boring bar and the feed screw is established, to permit the feed rate of the cutter, i.e., the speed at which the boring bar is moved axially by the feed screw, to adjust itself automatically to decrease as the cutting load increases and increase as the cutting load decreases thereby automatically adjusting the feed rate to the cutting load on the cutter.

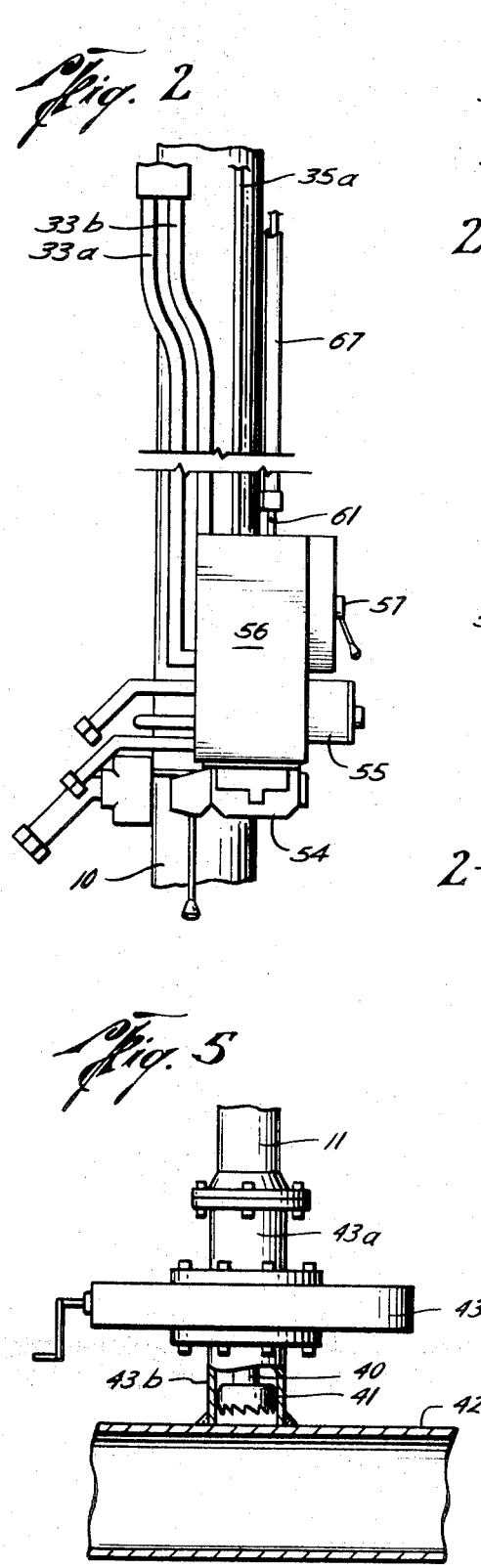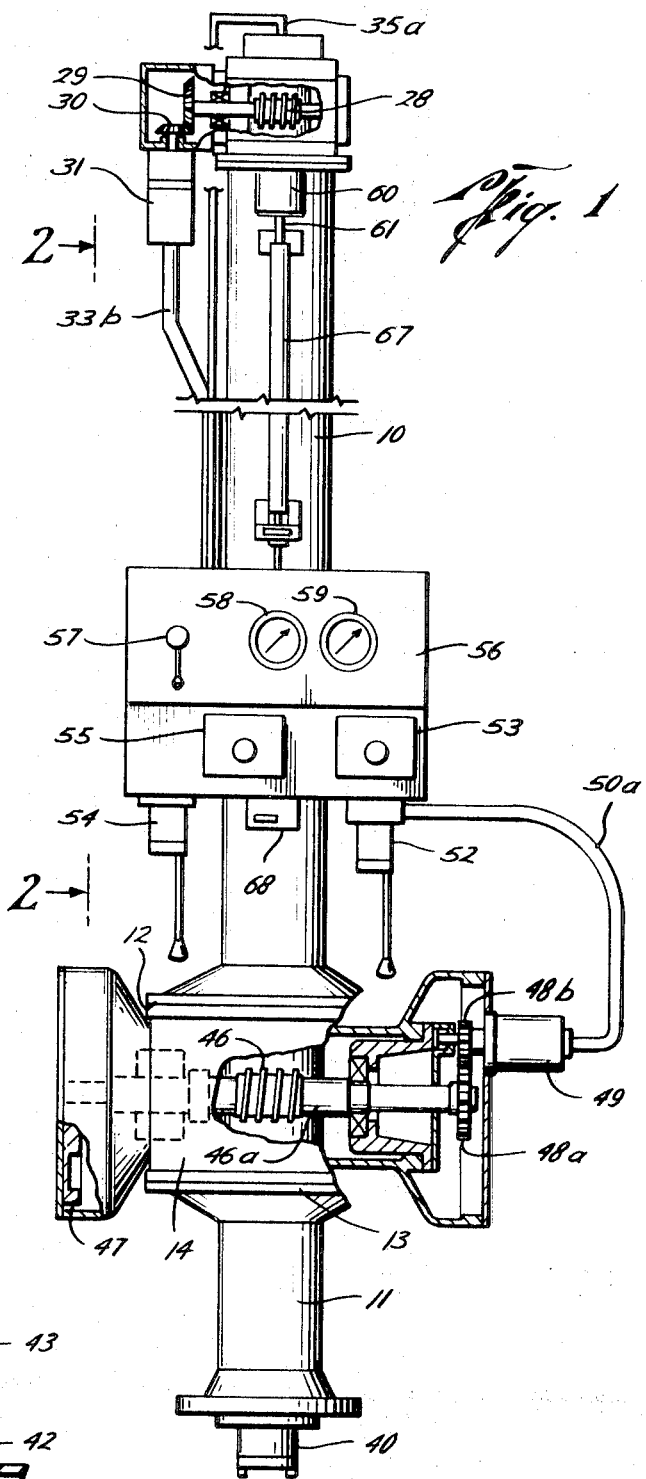

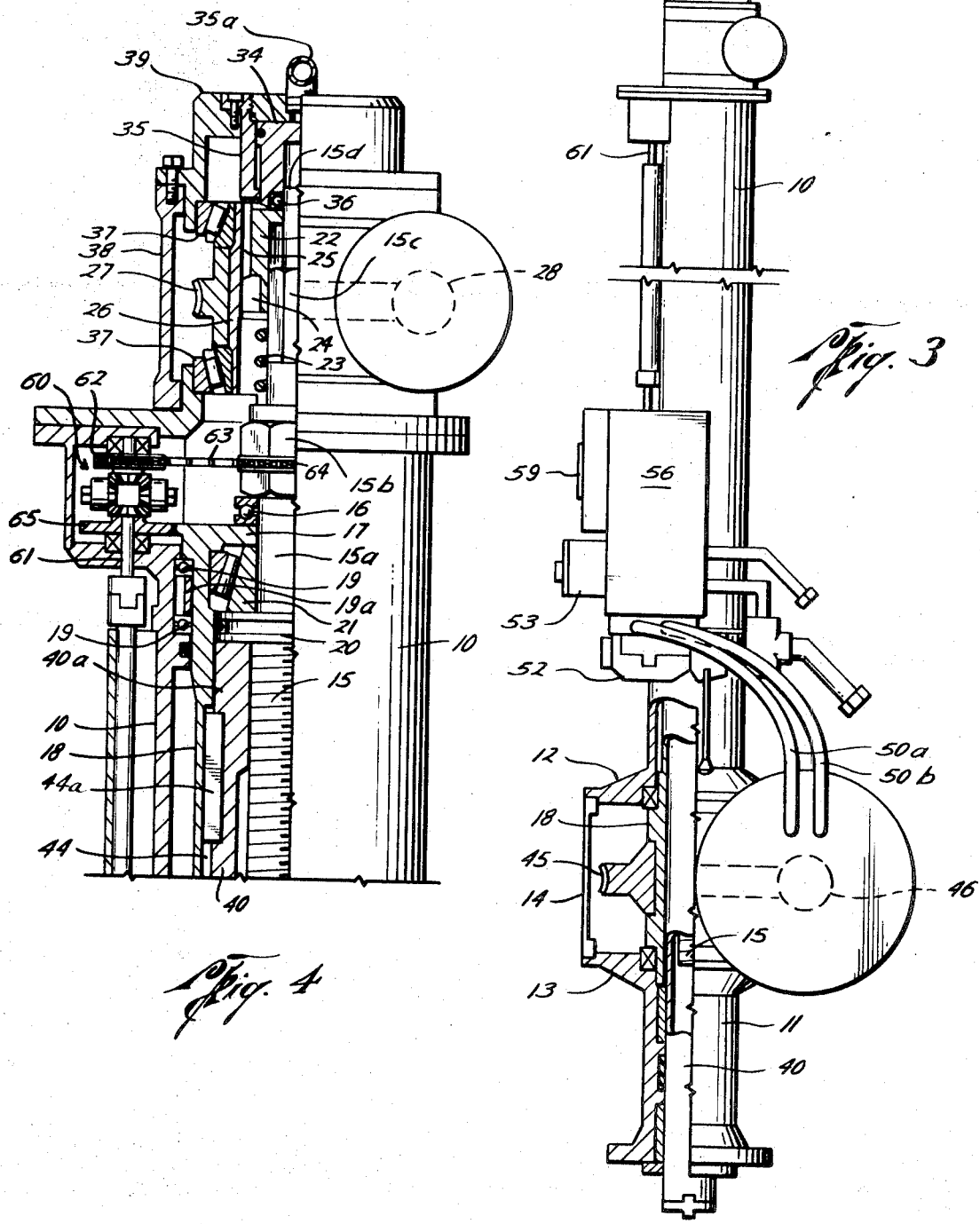

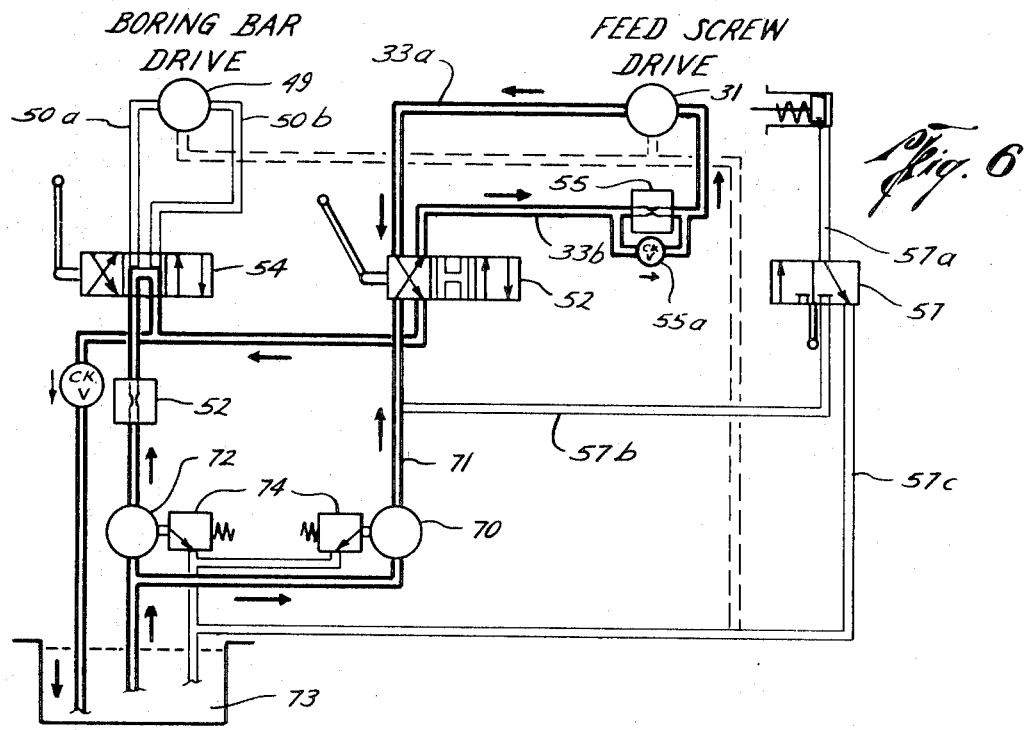
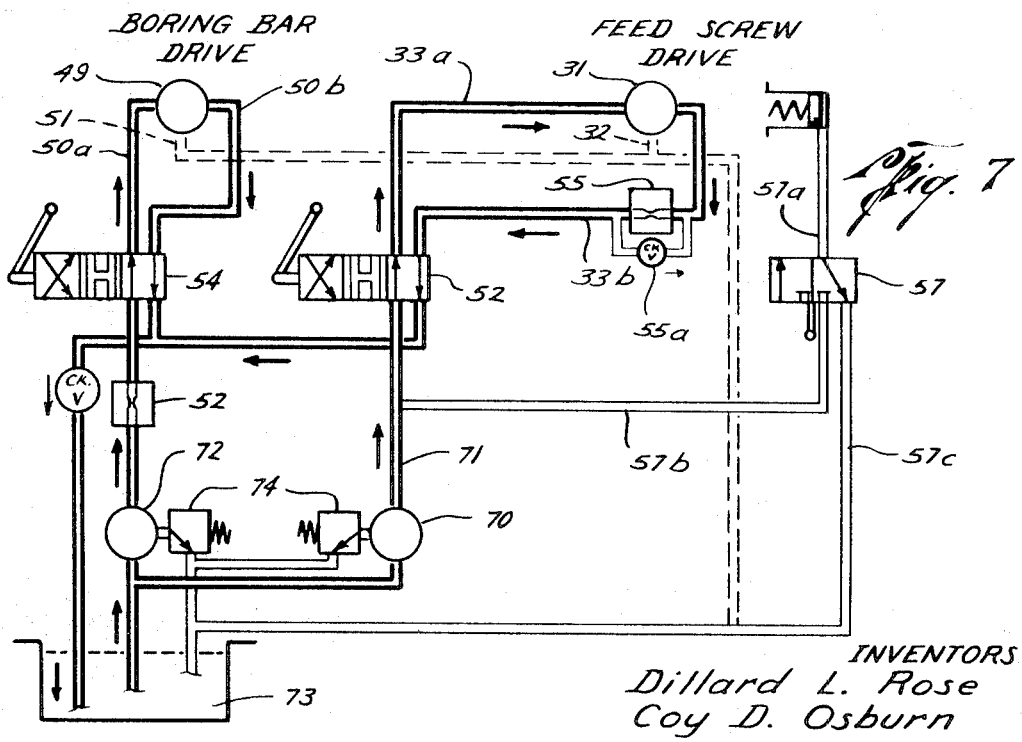

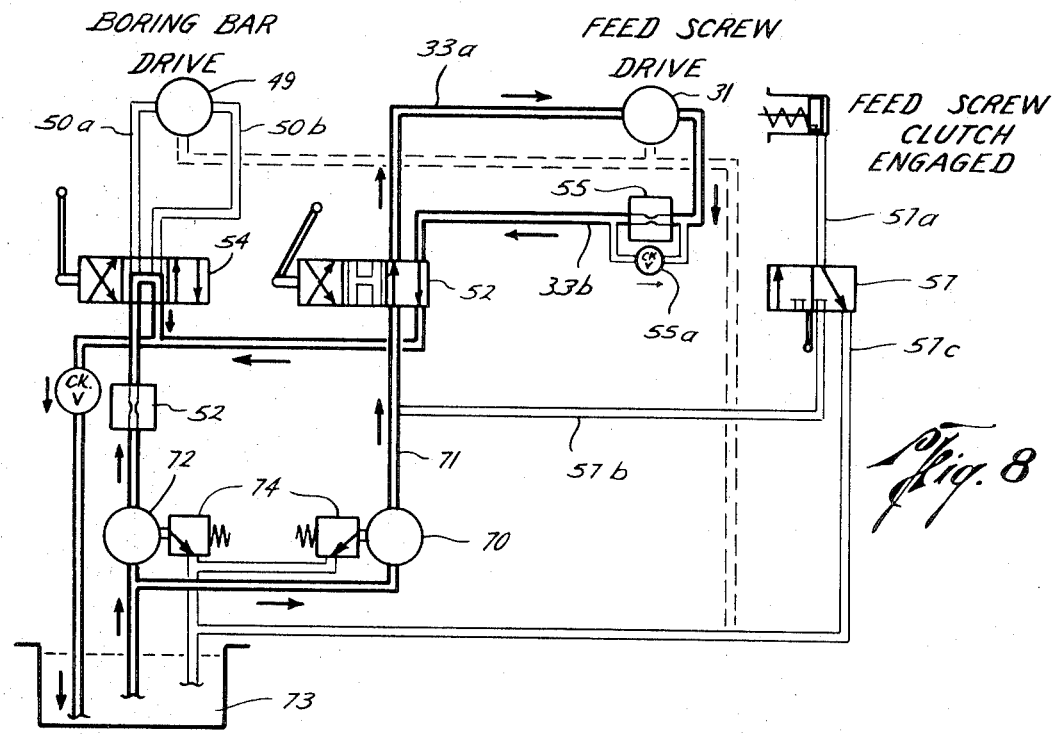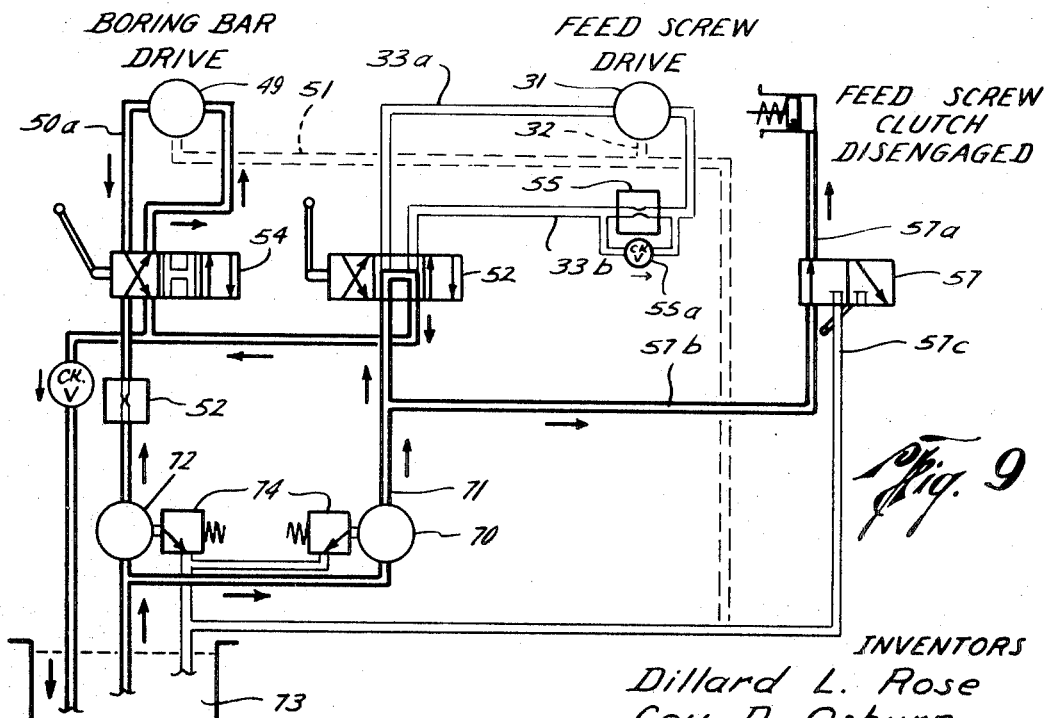

TAPPING APPARATUS

This invention relates to apparatus for tapping a hole or opening in a pressure vessel, such as a pipe or the like, and in particular to apparatus that can tap such pressure vessels when the pressure vessel is filled with fluid under pressure and do so without any substantial loss of fluid from the vessel.

The cutting of an opening through the wall of a pressure vessel or pipe, while the same contains a fluid under pressure, is commonly called "hot tapping." The hot tapping apparatus usually includes a valve and a pressuretight housing. The cutter is located within the pressuretight housing, out of sight of the operator, during the tapping operation.

Most of the pressure vessels to be tapped, such as pipe and tanks, are circular in cross section and present an arcuate surface to the cutter. As the cutter cuts its way through such a wall, the load on the cutter due to the cutting operation will vary because of the constantly changing amount of metal in contact with the teeth of the cutter. Preferably, the feed rate of the cutter should be varied as the load on the cutter varies to keep the load on the cutter and the apparatus not only from being excessive but also as close as possible to that required for efficient operation of the cutter.

It is an object of this invention to provide tapping apparatus that will vary the feed rate of the cutter as the load on the cutter varies.

It is another object of this invention to provide tapping apparatus that rotates the boring bar independently of the feed screw with the relative rotation of the boring bar and the feed screw determining the feed rate of the cutter through the vessel so that as the speed of rotation of the cutter is reduced by an increase in cutting load there is a corresponding reduction in relative rotation between the boring bar and the feed screw and a resultant reduction in the feed rate of the cutter through the work, conversely a decrease in load on the cutter produces an increase in feed rate by increasing the speed of relative rotation between the boring bar and the feed screw.

It is another object of this invention to provide tapping apparatus that will vary the feed rate of the cutter as it cuts a hole in a pressure vessel in response to the cutting load on the cutter.

It is another object of this invention to provide tapping apparatus that employs one motor to rotate the feed screw and a second motor to drive the boring bar and cutter, the second motor being of the type that will inherently slow down as the cutting load increases on the cutter and speed up when the cutting load decreases thereby changing the relative rotation between the boring bar and the feed screw of the apparatus to adjust the feed rate of the boring bar in accordance with the load on the cutter.

These and other objects, advantages and features of this invention will be apparent to those skilled in the art from a consideration of this specification, including the attached drawings and appended claims.

The preferred embodiment of the invention will now be described in connection with the attached drawings in which, FIG. 1 is a front view, partly in elevation and partly in section, of the preferred embodiment;

FIG. 2 is a side view of a part of the apparatus of FIG. 1 taken along line 2—2;

FIG. 3 is a view, partly in elevation and partly in section, of the right-hand side of the apparatus shown in FIG. 1;

FIG. 4 is a view, again partly in section and partly in elevation, of the upper portion of the apparatus shown in FIG. 3 on an enlarged scale;

FIG. 5 is a view of the lower portion of the apparatus of FIG. 1 showing how it is mounted on a pressure vessel, such as a pipeline, for tapping an opening in the vessel; and FIGS. 6–9 are schematic views of the hydraulic system of the apparatus illustrating the flow of hydraulic fluid for various operations performed by the apparatus during a hot tapping operation.

The apparatus has a supporting assembly for the various components. In the embodiment shown, this assembly includes upper tubular member 10 and lower tubular member 11. The adjacent ends of the two tubular members have flanges 12 and 13, which are connected together by gear housing 14.

Feed screw 15 is mounted on the supporting assembly for rotation around its longitudinal axis. The feed screw is supported for such rotation at the upper end of tubular housing member 10. This is best seen in FIG. 4. Upper end 15a of the lead screw, which is unthreaded, has section 15b of enlarged diameter to provide a downwardly facing shoulder to engage roller bearing 16. The roller bearing in turn is supported by inwardly extending annular flange 17, which is integrally connected to the upper end of drive sleeve 18. Longitudinally spaced bearings 19 engage a downward facing shoulder on the drive sleeve and an upwardly facing shoulder on tubular housing member 10 to support the drive sleeve for rotation relative to the housing member. The bearings are held apart by spacer ring 19a. Thrust bearing 21 is located between laterally extending flange 20 on the feed screw and flange 17 on the drive sleeve to hold the feed screw against upward axial movement (as viewed in FIG. 4), by the axial thrust that is imposed on the feed screw as it operates to feed a cutter through the wall of a pressure vessel.

Boring bar 40 is tubular shaped and feed screw 15 extends into the central longitudinally extending opening of the boring bar. Upper portion 40a of the bar is provided with female threads that engage the threads on feed screw 15 so that relative rotation between the bar and the feed screw will cause the bar to move axially in one direction or the other depending upon the direction of the relative rotation. As shown in FIG. 5, boring bar 40 is connected to cutter 41 and moves the cutter into and out of engagement with the vessel being tapped, such as pipe 42 in FIG. 5. Valve 43 is positioned between the apparatus and the vessel. By closing this valve the apparatus can be removed or repaired without opening up the line.

The boring bar also rotates cutter 41 and for this purpose means are provided to rotate the boring bar. In the embodiment shown, such means includes tubular drive sleeve 18 which encircles both the boring bar and the feed screw. As explained above in reference to FIG. 4, drive sleeve 18 is supported for rotation on bearings 19 and can rotate relative to the feed screw. Means are provided to prevent the drive sleeve from rotating relative to the boring bar, but to permit axial movement of the boring bar relative to the drive sleeve. In the embodiment shown, elongated key 44a (FIG. 4) is carried by the boring bar and engages elongated key slot 44 in the internal bore of drive sleeve 18. Thus, the boring bar can move axially relative to the drive sleeve, but cannot rotate relative to the drive sleeve.

As explained above, the load on the cutter will vary as it cuts through the wall of a pressure vessel. This is particularly true where the wall being tapped is curved as it will be the case in most instances. Being curved, the cutter will be in contact with a relatively constantly changing surface area of metal. This change in surface area in engagement with the cutting teeth of the cutter changes the cutting load on the cutter. Preferably, the feed rate of the cutter into the work piece is also changed to avoid overloading the cutter or the apparatus and to get the most efficient operation of the apparatus.

In accordance with this invention, means are provided for rotating the feed screw and boring bar that are responsive to the cutting load on the cutter to reduce the feed rate of the cutter as the load increases and to increase the feed rate of the cutter as the load decreases. The means rotating the feed screw and the boring bar accomplish this by varying the relative speed of rotation of the boring bar and the feed screw. This is done by arranging the rotating means so that while the speed of the feed screw is about constant the speed of rotation of the cutter will increase as the cutting load decreases and decrease as the load on the cutter increases. A decrease in cutter speed will decrease the relative speed of rotation between the boring bar and the feed screw and reduce the feed rate. Conversely, an increase in cutter speed, increases the relative speed of rotation of the boring bar and feed screw and increases the feed rate.

Means are provided to rotate lead screw 15 around its longitudinal axis. In the embodiment shown, section 15c of the feed screw adjacent its upper end is shaped as a hexagon in cross section (FIG. 4). This section extends into cup-shaped clutch member 22, which has a hexagon shaped bore into which the hexagon-shaped section of the feed screw extends. This provides a driving connection between clutch sleeve 22 and the feed screw. The clutch sleeve is movable axially along the feed screw and is guided adjacent its upper end by top section 15d of the feed screw. Coil spring 23 urges clutch sleeve 22 upwardly to the position shown in FIG. 4 in which position the clutch is engaged. In this position, key 24 engages key slot 25 in tubular member 26. This member extends through the bore of and is attached to ring gear 27 so that rotation of the ring gear will be transmitted through annular member 26, key 24, and clutch sleeve 22 to the upper end of feed screw 15.

The ring gear is rotated by worm 28, which in turn is driven by mating bevel gear 29 and 30. Driving gear 30 is attached to the output shaft of hydraulic motor 31. Pressure fluid is supplied to this fluid motor by hoses 33a and 33b. One hose acts as an input line and the other as the exhaust depending on the direction of rotation of the feed screw.

For the purposes that will be described below, clutch member 22 is part of the clutch means that are provided to disconnect feed screw 15 from the gear train that drives it. In the embodiment shown, clutch piston 34 is mounted in cylinder 35 above the upper end of the feed screw. By supplying hydraulic pressure into the upper end of cylinder 35 through line 35a, piston 34 will move clutch sleeve 22 downwardly until key 24 clears the lower end of key slot 25. This will disengage the feed screw from the gear train through which it is driven by motor 31.

Bearing 36 is provided between piston 34 and clutch 22 to permit the clutch sleeve to freely rotate relative to the piston. When pressure is released from the upper side of piston 34, spring 23 will return the clutch to its engaged position and the feed screw will be again connected through the gear train to drive motor 31. Bearings 37 support ring gear assembly 27 for rotation by the worm gear. The gear train and the fluid clutch are located in housing 38 and cap 39, respectively. The cap is attached to the top of housing 38. Both are supported by housing member 10.

In accordance with this invention, means that can vary its output speed with the load on the cutter is provided to rotate the drive sleeve to in turn rotate the boring bar and the cutter. In the embodiment shown (FIG. 3), ring gear 45 is mounted on drive sleeve 18 for rotation with the drive sleeve. The ring gear is rotated by worm gear 46 (FIG. 1), which in turn is driven by spur gears 48a and 48b. Gear 48b is mounted on the output shaft of second fluid motor 49. Worm gear shaft 46a extends to the left as viewed in FIG. 1 and supports flywheel 47. This adds inertia to the rotating boring bar to help it overcome quick changes in the load on the cutter and smooth out its operation generally.

Two inlet hoses, 50a and 50b, are connected to fluid motor 49 to supply it with fluid under pressure and cause it to rotate in either of two directions. The flow of hydraulic fluid to motor 49 through hoses 50a and 50b is controlled by reversing valve 52. This valve will determine the direction in which the motor runs. The fluid to the motor also flows through speed control valve 53. This valve is adjustable and determines the speed at which motor 49 can rotate the drive sleeve and the boring bar with a given load on the cutter.

The fluid that flows to feed screw drive motor 31 passes through reversing valve 54 and speed control valve 55. The two speed control valves and the two reversing valves are mounted on instrument panel 56 as shown in the drawings. Also mounted on the instrument panel is hydraulic clutch control valve 57 and pressure gages 58 and 59 that indicate the hydraulic pressure flowing to the drive motors.

As stated above, relative rotation between the feed screw and the boring bar will cause axial movement of the boring bar. In a tapping operation, the operator cannot see where the cutter is with respect to the vessel being tapped. Therefore, means are provided to indicate to the operator the relative travel of the boring bar with respect to the feed screw. In the embodiment shown (FIG. 4), differential 60 is arranged to drive countershaft 61, as the differential is driven by the feed screw and the boring bar. As shown upper wheel 62 of the differential (which in this case is a sprocket) is driven by roller chain 63 and sprocket 64, which is mounted on section 15b of the feed screw.

Since rotation of the boring bar is in turn imparted to the drive sleeve, the drive sleeve can be used to drive lower wheel 65 of the differential. In this case, the lower wheel is a gear that meshes with gear teeth around the periphery of flange 17 on the upper end of drive sleeve 18. The gear ratio between gear 65 and the gear teeth on the drive sleeve is such that it will combine with the size of sprockets 62 and 64 and rotate shaft 61 the proper number of revolutions for each unit of linear movement the boring bar makes relative to the feed screw. The shaft extends downwardly through housing 67 an drives counter 68, which is calibrated to indicate linear travel in whatever convenient linear units are desired, such as inches.

Fluid motors 31 and 49 are of the type that can be supplied with fluid pressure at a constant pressure and they will slow down as the load on them increases and speed up as the load thereon decreases. One such motor that can be used for this purpose is supplied by Vickers, Incorporated, a division of Sperry Rand Corporation, at Troy, Mich. The specific motor preferred is the constant displacement in-line piston type. Coupled with the motors, fluid pumps are used that preferably will supply pressure fluid to the motors at more pressure and at a higher volume than will be required for any anticipated load on the apparatus. This allows speed control valves 55 and 53 to be adjusted for the motors to have the desired output speed under a given load on the cutter. One such pump that can be used again is manufactured by Vickers. This is their variable displacement in-line piston-type pump Series M–PVB 20. These pumps are not shown in the drawings except schematically in connection with the hydraulic system to be explained later. Usually, they are mounted on a power skid. The power for the pumps can be any convenient source such as an electric motor or internal combustion engine. The flow control valves are also available from Vickers and are of the type that can be adjusted to hold a constant pressure differential across them. Reversing valves 52 and 54 are of any convenient fluid control type. One such that can be used again is supplied by Vickers. It is their CM–2 and CM–3 Series valves. The one preferred is this type valve with a "B" spool.

With this arrangement then the relative speed between the feed screw and the boring bar can be adjusted by adjusting the output speed of motors 31 and 49 by the speed control valves 53 and 55. The operator can set the two speed control valves so that the boring bar is rotating a given amount faster than the feed screw. This will move the cutter toward the vessel at a given rate. When the cutter contacts the vessel and begins to cut through it, the load on the cutter will, of course, increase. This will slow down the rotation of the cutter and the boring bar and reduce the relative rotation between the boring bar and feed screw. This reduces the feed rate of the cutter and the reduction is in proportion to the load on the cutter. As the load increases, further reductions in the relative rotational speed of the boring bar and feed screw will occur. As the load on the cutter decreases, the relative rotation will increase and the feed will increase again in proportion to the load.

Thus, with the arrangement of this invention, the feed of the cutter will automatically adjust itself to the load on the cutter. If the cutter should hang up, for example, and be stopped in its rotation or be reduced in rotational speed until its speed is less than that of the feed screw, the direction of feed will reverse and the feed screw will move the cutter out of contact with the work. Once cleared of the work, the original relative rotation of the boring bar and feed screw will be reestablished and the cutter will again be advanced into engagement with the work. This will be done automatically without any action having to be taken by the operator.

The operation of the apparatus shown in the drawings will now be described with reference to the hydraulic systems shown schematically in FIG. 6–9. The apparatus is mounted on valve 43, as shown in FIG. 5. Initially cutter 41 will be above the valve within upper valve spool 43a. The valve is opened and the cutter moved to a position just above the vessel to be tapped, which is pipeline 42 in the drawings. To so move the cutter only the feed screw is rotated. As shown in FIG. 6, pump 70 and pump 72 are both in operation. The fluid discharged from pump 70 travels through line 71 to reversing valve 52, which is positioned to direct hydraulic fluid through lines 33b and 33a to feed screw drive motor 31. The hydraulic fluid bypasses speed control valve 55 through check valve 55a since no speed control is necessary when the feed screw is rotated in this direction. When it is desired to control the speed of the motor, as will be explained below, the flow of hydraulic fluid is reversed and the valve will control the speed of the motor by controlling the flow of fluid out of the motor.

No fluid is supplied to the boring bar drive motor 49 because valve 54 is closed. This rapidly advances the boring bar axially allowing the operator to move the boring bar downwardly to a position just above pipeline 42. The operator will know approximately the distance between where the cutter was initially and the pipeline. By watching counter 68 he will stop any further rotation of the feed screw when the cutter has been moved the proper distance into fitting 43b.

The next step is the tapping operation. Initially, flow control valves 52 and 55 are adjusted for motors 31 and 49 to rotate both the feed screw and the boring bar at the same speed. No axial movement of the boring bar will occur and the apparatus can be checked to see if everything is operating properly. Pumps 70 and 72 do not require relief valves; however, relief valves 74 are provided in the system for safety and for unloading as required during startup.

If everything is in order, the rotational speed of the feed screw is reduced by adjusting speed control valve 55. The speed is reduced until the desired feed rate of the boring bar is obtained. Note that the direction of rotation of the feed screw during the tapping operation is opposite the direction it is rotated to move the cutter downward in FIG. 6, i.e., it is rotated in the direction to move the cutter away from the pipe. Rotating the drive bar faster than the feed screw produces the relative rotation required to move the cutter toward the pipe. The feed rate is determined by watching counter 68. Enough clearance is left between the cutter and the pipe to permit the feed rate to be established before the cutter reaches the pipe. As the cutter starts boring into the pipe, there will be a reduction in its rotational speed. This is expected and is taken into consideration when the speed of rotation under no load is established. With experience, operators will gain a feel for the amount the speed of rotation of the cutter will decrease. The proper rate of feed of the cutter depends on its size. Here again experienced operators will know generally the desired range.

With this apparatus, however, a mistake in feed rate will not cause any damage to the apparatus. For as explained above, should the cutter be fed too fast, it will slow down due to the increased workload. This will reduce the relative rotation between the boring bar and feed screw and reduce the feed accordingly. If the load is such that the cutter speed drops below that of the feed screw, the direction of feed will reverse and the cutter will be moved away from the work until its speed again exceeds that of the feed screw. This automatic and instantaneous change in feed rate is particularly advantageous when the cutter hangs up and is stopped by the work.

When the cutter has cut the coupon from the side of the vessel being tapped, the boring bar is retracted back above valve 43 of FIG. 5. This operation is shown in FIG. 8. This figure is the same as FIG. 6 except that the direction of flow of hydraulic fluid to motor 31 has been changed by reversing valve 52. Once the cutter is above the valve and the valve is closed, the cutter can be removed from the end of the boring bar and other operations in connection with the tapping of the vessel carried out. The apparatus can be used for example, to set a releasable plug in the opening just cut in the pipeline to close it off until such time as it is desired to connect into the line. The use of such a plug allows the removal of the valve and avoids tying up a valve until the connection is ready to be made.

The plug is attached to the end of the boring bar, the valve opened, and the feed screw operated as shown in FIG. 6 to run the plug downwardly into position in the opening in the vessel. The plug may be connected to the boring bar by a threaded connection. If it is, it will be necessary to rotate the boring bar to release it from the plug. For this purpose, hydraulic clutch valve 57 is opened, as shown in FIG. 9, to disengage the feed screw from drive motor 31 and allow it to freely rotate with the boring bar. The boring bar drive motor can then be actuated to rotate the boring bar in whichever direction is required to unscrew it from the plug without having to worry about creating any undue stresses on the boring bar. The boring bar will not move vertically when the clutch is disengaged. Therefore, the relative movement required to unscrew the threaded connection must be provided for somewhere else, such as in the connection between the boring bar and the plug.

From the foregoing description of one embodiment of this invention, by way of example, it will be seen that this invention is one well adapted to attain all of the ends and objects hereinabove set forth, together with other advantages which are obvious and which are inherent to the apparatus and structure.

The invention having been described, what is claimed is:

1. Apparatus for tapping an opening in a pressure vessel such as a pipe or the like, comprising a supporting assembly for positioning adjacent the pressure vessel, a feed screw mounted on the supporting assembly for rotation around its longitudinal axis, a boring bar connected to the feed screw for axial movement relative to the boring bar upon relative rotation of the feed screw and bar, a cutter connected to the boring bar for rotation by the boring bar and for movement by the boring bar into and out of engagement with a pressure vessel, means for rotating the feed screw, and means for rotating the boring bar and the cutter to cause the cutter to tap the vessel when moved into engagement therewith by the relative rotation of the feed screw and the boring bar, said boring bar rotating means being responsive to the load imposed on the cutter to vary the relative speed of rotation of the boring bar and the feed screw and adjust the rate the feed screw moves the boring bar and the cutter in response to the load imposed thereon by the vessel being tapped.

2. The apparatus of claim 1 in which the boring bar is tubular having a central longitudinally extending opening into which the feed screw extends.

3. The apparatus of claim 2 in which the means for rotating the boring bar includes a tubular drive sleeve having a central longitudinally extending opening into which the boring bar extends for movement axially of the drive sleeve, means mounting the drive sleeve for rotation in the supporting assembly, and means to transmit the rotation of the drive sleeve to the boring bar as the boring bar moves axially relative to the drive sleeve.

4. The apparatus of claim 1 in which the means for rotating the feed screw and the boring bar includes first and second fluid powered motors, respectively, and first and second speed control means to adjust the pressure of the fluid supplied to the first and second motors respectively to provide the desired axial movement for the cutting load on the cutter and to thereafter hold the pressure constant to permit the relative rotation to change as the load on the cutter changes and adjust the rate the boring bar is moved axially accordingly.

5. The apparatus of claim 1 further provided with clutch means releasably connecting the means rotating the feed screw to the feed screw.

6. The apparatus of claim 5 in which the clutch means is operated by fluid pressure.

7. Apparatus for tapping an opening in a pressure vessel such as pipe or the like, comprising a cutter to cut the opening, a boring bar connected to the cutter and movable axially to move the cutter into and out of engagement with a pressure vessel, to rotate the cutter and to feed the cutter through the vessel as it is rotated to cause it to cut an opening in a pressure vessel, a feed screw threaded to the boring bar to support the boring bar and to move the boring bar axially to move the cutter into engagement with the vessel and to feed the cutter through the vessel at a rate determined by the speed of relative rotation of the feed screw and the boring bar, means rotating the feed screw and the boring bar and adjustable means to vary the relative speed of rotation of the boring bar and the feed screw as required to move the boring bar axially at the desired speed for a given cutting load on the cutter, said rotating means being such that the speed of rotation of the cutter will increase as the cutting load decreases and decrease as the load on the cutter increases thereby changing the relative rotation of the feed screw and the boring bar to adjust the feed rate in response to changes in the cutting load on the cutter by increasing the feed rate as the cutter load goes down and vice versa.

8. The apparatus of claim 7 in which the rotating means includes first and second fluid motors for rotating the feed screw and the boring bar, respectively.

9. The apparatus of claim 8 in which the adjustable means includes valve means to permit the pressure of the fluid supplied to the first and second fluid motors to be adjusted to provide the relative rotation between the boring bar and the feed screw that moves the boring bar toward engagement with the vessel at the desired speed and maintain said pressure of the supply fluid thereafter when the load on the second motor increases thereby allowing the load increase to cause a reduction in the speed of rotation of the motor and the boring bar which reduces the relative speed of rotation of the boring bar and the feed screw and produces a decrease in the speed the boring bar moves the cutter as it cuts through the vessel.

10. Apparatus for tapping an opening in a pressure vessel such as a pipe or the like, comprising, a housing, a feed screw mounted for rotation in the housing, a boring bar supported by the feed screw and movable axially by relative rotation of the feed screw and boring bar, a cutter carried by the boring bar for cutting an opening in a pressure vessel, and first and second means for rotating the feed screw and boring bar, respectively, said second means being responsive to the cutting load on the cutter to reduce the speed of the cutter as the load increases and to increase the load on the cutter as the load decreases to thereby automatically vary the speed the feed screw moves the boring bar axially as the load on the cutter varies.

11. Apparatus for tapping an opening in a pressure vessel such as a pipe or the like comprising, a frame, a feed screw mounted for rotation on the frame, a boring bar in engagement with the feed screw to be moved longitudinally by relative rotation of the boring bar and the feed screw, a drive sleeve mounted on the frame for rotation around its longitudinal axis, means connecting the drive sleeve and boring bar to hold them against relative rotation while allowing the bar to move longitudinally relative to the sleeve, and means for rotating the feed screw and the drive sleeve independently so that the relative rotation of the boring bar and the feed screw which produces the axial movement of the bar and the rate of feed of the cutter into the work is determined by the relative speed of rotation of the drive sleeve and the feed screw.